(12) United States Patent
Lewin-Eytan et al.

(10) Patent No.: US 10,652,187 B2
(45) Date of Patent: May 12, 2020

(54) SYSTEM AND METHOD FOR RELEVANCE-BASED ELECTRONIC MESSAGE PRESENTATION

(71) Applicant: OATH INC., New York, NY (US)

(72) Inventors: Liane Lewin-Eytan, Binyamina (IL); David Carmel, Haifa (IL); Yoelle Maarek, Haifa (IL); Ariel Raviv, Haifa (IL); Alexander Libov, Haifa (IL); Peter Monaco, Los Altos, CA (US)

(73) Assignee: OATH INC., New York, NY (US)

( * ) Notice: Subject to any disclaimer, the term of this patent is extended or adjusted under 35 U.S.C. 154(b) by 530 days.

(21) Appl. No.: 15/150,918

(22) Filed: May 10, 2016

(65) Prior Publication Data

US 2017/0329779 A1 Nov. 16, 2017

(51) Int. Cl.
*H04L 12/58* (2006.01)
*G06Q 10/10* (2012.01)
*G06F 16/335* (2019.01)

(52) U.S. Cl.
CPC ............ *H04L 51/16* (2013.01); *G06F 16/335* (2019.01); *G06Q 10/10* (2013.01); *G06Q 10/107* (2013.01); *H04L 51/22* (2013.01)

(58) Field of Classification Search
CPC ... H04L 51/16; H04L 51/22; G06F 17/30699; G06Q 10/107
USPC ........................................................ 707/725
See application file for complete search history.

(56) References Cited

U.S. PATENT DOCUMENTS

| | | | |
|---|---|---|---|
| 9,356,901 B1* | 5/2016 | Kennberg | G06Q 10/107 |
| 9,449,050 B1* | 9/2016 | Molina | G06F 17/3053 |
| 2011/0093459 A1* | 4/2011 | Dong | G06F 16/9535 707/725 |
| 2011/0173553 A1* | 7/2011 | Karmon | G06Q 10/107 715/767 |
| 2012/0166438 A1* | 6/2012 | Wu | G06F 17/3064 707/737 |
| 2014/0359480 A1* | 12/2014 | Vellal | H04L 51/16 715/752 |
| 2016/0179938 A1* | 6/2016 | Ghafourifar | G06F 21/6227 707/609 |
| 2016/0321694 A1* | 11/2016 | Vorozhtsov | G06Q 30/02 |
| 2017/0083590 A1* | 3/2017 | Jagarlamudi | G06F 16/335 |
| 2017/0193064 A1* | 7/2017 | Judd | G06F 16/248 |

* cited by examiner

*Primary Examiner* — Pierre M Vital
*Assistant Examiner* — Alicia M Antoine
(74) *Attorney, Agent, or Firm* — James J. DeCarlo; Greenberg Traurig, LLP

(57) ABSTRACT

Relevant messages, or "hero results", which are not ranked at the uppermost part of a time-based listing of search results are identified and such hero results can be displayed apart from the time-based listing of search results. A user can be provided with messages in a time-based presentation as well as messages in a relevance-based presentation. The user can be presented with the most relevant messages from a set of message generated from a search query, even where the most relevant messages are not the most recent ones.

21 Claims, 9 Drawing Sheets

SYSTEM AND METHOD FOR RELEVANCE-BASED ELECTRONIC MESSAGE PRESENTATION

FIELD OF THE DISCLOSURE

The present disclosure relates to presenting electronic messages, and more particularly to presenting electronic messages based on relevance to a search query.

BACKGROUND

Electronic messaging, such as for example electronic mail (email) messaging, has become a common form of communication. Incoming messages are typically stored in a user's inbox folder (inbox), or other message repository. Due in large part to the popularity of electronic messaging, the use's inbox continues to grow in size, such that it has become difficult for the user to find an electronic message.

SUMMARY

A need exists to facilitate a user's searching of electronic messages in a user's cluttered inbox, or other electronic message folder or repository. The present disclosure seeks to address failings in the art and to provide a mechanism for identifying and presenting a number of "heroes", or most relevant messages, for a given query apart from a regular time-based list of results of the query. By improving an electronic message application's search functionality to generate and return to the user messaging search results that are more relevant to a user's search query, it encourages users to stay on an application provider's application or web site or web page longer, and/or encourages users to use a web provider's web-based messaging and/or other web-based facilities, thus increasing user engagement and loyalty with the provider's web site, web page, applications, facilities, etc.

In accordance with one or more embodiments, a user interface display is provided, which comprises a heroes display component and a time-based results component. The heroes display, which may be displayed above the time-based results display, comprises a number, H, of the most relevant search results from a set of search results generated in response to a received search query. The results in the heroes display can be ordered based on relevance. The time-based results component displays search results in a temporal order, and items included in the heroes display can be sorted based on search query relevance. Embodiments of the present disclosure ensure that messages are not duplicated across the time-based and relevance-based display components.

Embodiments of the present disclosure provide a mechanism for identifying relevant messages, or "hero results", which may not be ranked at the uppermost part of a time-based listing of search results, and display such hero results prominently, e.g., above, the time-based listing of search results. A user can be provided with messages in a time-based presentation as well as messages in a relevance-based presentation. The user can be presented with the most relevant messages from a set of message generated from a search query, even where the most relevant messages are not the most recent ones.

In a "re-find" approach, a user attempts to retrieve a message that the user has seen before by entering query and reviewing a set of search results ordered by time, e.g., time of receipt. The re-find approach can be very frustrating to a user that enters a vague query as opposed to a selective query with distinctive wording, since a mail search mechanism returns any message relevant to the user's query. A more selective query can limit the search results; however, it is often the case that the user does not remember precisely the terms that could efficiently narrow his search.

An older more relevant message is difficult to find using a strictly time-based approach. Without the benefit of a "heroes presentation" provided by embodiments of the present disclosure, the user is often forced to browse and peruse the search results using an ordering, e.g., a time-based order, which is the most common ordering, but is not ordered based on search query relevance. One or more messages that are highly relevant to a user's search query but are not the most recent message(s) appear at lower places in the list that is ordered based on time, which causes the message(s) to be harder to discover by the user.

In accordance with one or more embodiments a computing device is provided, which comprises a processor and a storage medium for tangibly storing thereon program logic for execution by the processor, the stored program logic comprising: receiving logic executed by the processor for receiving message search request user input; generating logic executed by the processor for generating time-ranked search results and relevance-ranked search results selected from a corpus of messages using a search query associated with the received search request, each selected message having temporal data and a relevance score representing its relevance to the search query; selecting logic executed by the processor for selecting a first number of messages from the time-ranked search results for a first message set to be displayed in a search results display presentation for the user, the first message set selection being based on a temporal ordering of the search results using the temporal data associated with each message in the search results; selecting logic executed by the processor for selecting a determined second number of messages from the relevance-ranked search results, the selecting comprising excluding any message selected for the first message set in selecting the determined second number of messages; generating logic executed by the processor for generating the search results display presentation having a first display area comprising an entry for each message in the first message set temporally ordered in accordance with the temporal data of the messages selected for the first message set, the generating comprising determining based on the determined second number whether to include a second display area comprising an entry for each message of the determined second number of messages in the second message set ordered based on relevance to the search query; and providing logic executed by the processor for providing the display presentation for display by a client computing device in response to the message search request.

In accordance with one or more embodiments, a method is provided, the method comprising receiving, by a computing device, message search request user input; generating, by the computing device, time-ranked search results and relevance-ranked search results selected from a corpus of messages using a search query associated with the received search request, each selected message having temporal data and a relevance score representing its relevance to the search query; selecting, by the computing device, a first number of messages from the time-ranked search results for a first message set to be displayed in a search results display presentation for the user, the first message set selection being based on a temporal ordering of the search results using the temporal data associated with each message in the search results; selecting, by the computing device, a determined second number of messages from the relevance-ranked search results, the selecting comprising excluding any message selected for the first message set in selecting the determined second number of messages; generating, by the computing device, the search results display presentation having a first display area comprising an entry for each message in the first message set temporally ordered in accordance with the temporal data of the messages selected for the first message set, the generating comprising determining based on the determined second number whether to include a second display area comprising an entry for each message of the determined second number of messages in the second message set ordered based on relevance to the search query; and providing, by the computing device, the display presentation for display by a client computing device in response to the message search request.

In accordance with yet another aspect of the disclosure, a non-transitory computer-readable storage medium is provided, the storage medium being tangibly encoded with computer-executable instructions, that when executed by a processor associated with a computing device, performs a method comprising: receiving message search request user input; generating, by the computing device, time-ranked search results and relevance-ranked search results selected from a corpus of messages using a search query associated with the received search request, each selected message having temporal data and a relevance score representing its relevance to the search query; selecting, by the computing device, a first number of messages from the time-ranked search results for a first message set to be displayed in a search results display presentation for the user, the first message set selection being based on a temporal ordering of the search results using the temporal data associated with each message in the search results; selecting, by the computing device, a determined second number of messages from the relevance-ranked search results, the selecting comprising excluding any message selected for the first message set in selecting the determined second number of messages; generating the search results display presentation having a first display area comprising an entry for each message in the first message set temporally ordered in accordance with the temporal data of the messages selected for the first message set, the generating comprising determining based on the determined second number whether to include a second display area comprising an entry for each message of the determined second number of messages in the second message set ordered based on relevance to the search query; and providing the display presentation for display by a client computing device in response to the message search request.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code to implement functionality in accordance with one or more such embodiments is embodied in, by and/or on a computer-readable medium.

DRAWINGS

The above-mentioned features and objects of the present disclosure will become more apparent with reference to the following description taken in conjunction with the accompanying drawings wherein like reference numerals denote like elements and in which:

FIG. 1 provides an example of a process flow in accordance with one or more embodiments of the present disclosure.

FIG. 2 provides an example of a device display including a response display presentation in accordance with one or more embodiments of the present disclosure.

FIG. 3, which comprises FIGS. 3A and 3B, provides an example of a message selection process flow in accordance with one or more embodiments of the present disclosure.

FIG. 4 provides an exemplary overview of components used in connection with the process flow of FIG. 3.

FIG. 5 provides another message selection process flow in accordance with one or more embodiments of the present disclosure.

FIG. 6 provides some examples illustrating search result presentation listings in accordance with one or more embodiments of the present disclosure.

DETAILED DESCRIPTION

Figure 1:
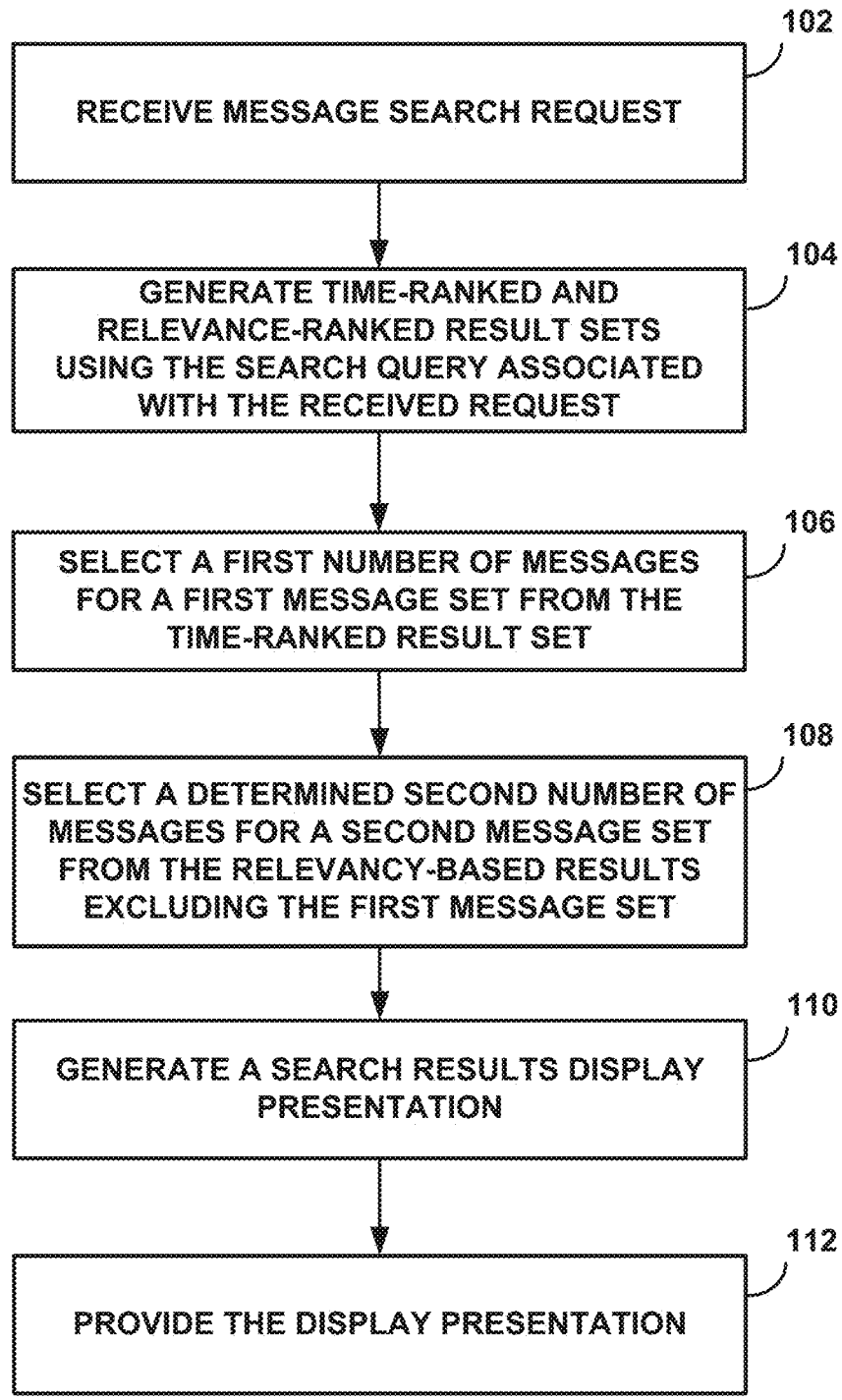

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the,"

again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The detailed description provided herein is not intended as an extensive or detailed discussion of known concepts, and as such, details that are known generally to those of ordinary skill in the relevant art may have been omitted or may be handled in summary fashion. Certain embodiments of the present disclosure will now be discussed with reference to the aforementioned figures, wherein like reference numerals refer to like components.

In general, the present disclosure includes a relevance-based electronic message ranking system, method and architecture. Embodiments of the present disclosure include a combination of time-ranking and relevance-ranking, and an optimization of the results presented in the window shown to the user in accordance with the time-ranking and relevance-ranking. FIG. 1 provides an example of a process flow in accordance with one or more embodiments of the present disclosure. The process flow may be executed by a client computing device, or by a server computing device, for example. In the example shown in FIG. 1, a message search request is received at step 102. At step 104 a set of search results is generated using a search query associated with the received request. By way of a non-limiting example, the search query can comprise one or more search terms provide by the user as part of the received search request. The one or more search terms can be used to generate the set of search results comprising a number of electronic messages, such as and without limitation email messages, satisfying the search query.

Each message in the set of search results has associated temporal data, such as and without limitation data identifying the date and time that the message was received, sent, etc., and relevance data, such as in without limitation a relevance score indicating the message's degree, or measure, of relevance to the search query. A relevance score of a message can be determined using a learning to rank model, taking into account a rich set of features, including time recency (which is considered together with other features of the set), textual similarity to the query (which can be determined with respect to the message field(s) where the query's term(s) was/were identified), message sender attributes, as well as mail specific features such as actions of the user(s) performed over the message (such as and without limitation read, open, reply, mark star, etc. user actions). Embodiments of the present disclosure retrieve two sets of results using the search query, a set ranked based on time and a set ranked based on relevance. With the time-ranked result set, result items are identified using the search query's search term(s), the identified result items are ranked based on time and a number of the top ranked (most recent) result items are selected. Thus, the time-ranked result set are selected based on similarity to the search query and are ranked based on temporal data. With the relevance-ranked set of results, result items are identified based on similarity to the search query (where the similarity measure is typically, but need not be, more relaxed than the similarity measure used for retrieval of the time ranked set), the identified result items are ranked based on relevance to the search query, and then a number of the top-ranked (most relevant) results items are selected for the relevance-ranked result set.

At step 106, a first number of messages are selected from the time-ranked result set for a first message set, The number of messages selected for the first message set can at least initially be based on a size of a screen, or display, at which a response display presentation is to be provided, e.g., displayed. For purposes of illustration, the size can be represented as a number of entries, k. The value of k may vary based on the window size, the display size, a combination of display and window sizes, etc.

Figure 2:
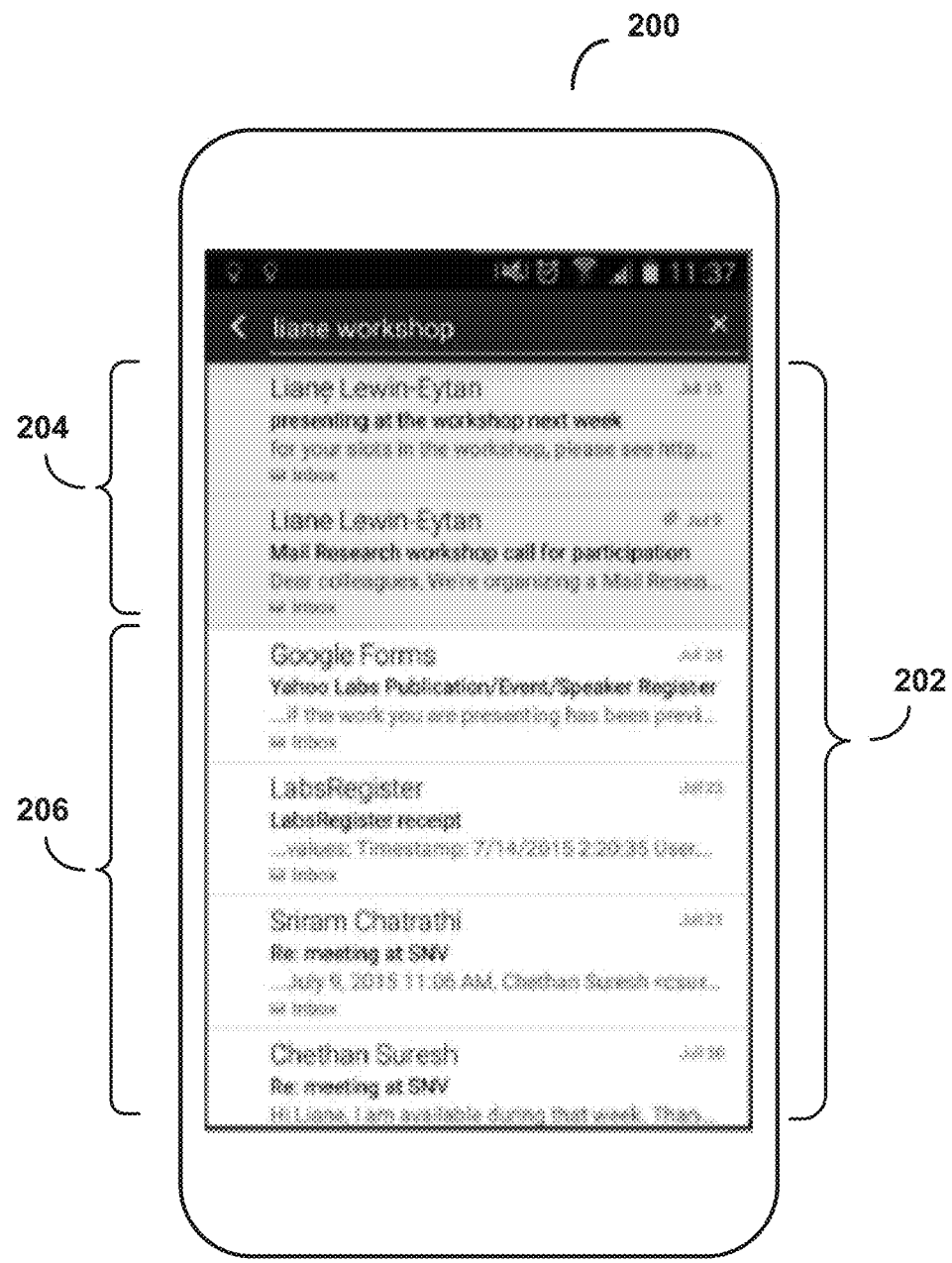

FIG. 2 provides an example of a device display including a response display presentation in accordance with one or more embodiments of the present disclosure. In the example shown in FIG. 2, display area 202 comprises a listing with a number of entries, each of which corresponds to a message selected from search results generated using a search query associated with the received search request. In accordance with one or more embodiments, display area 202 can comprise one or more display areas, such as display area 206 and display area 204. Display area 204 provides a listing of entries each of which is selected based on relevance, for a relevance-based listing, and display area 206 provides a listing of entries selected based on temporal data, for a time-based, or temporal-based, listing. A scrolling option is typically (but need not be) provided for the time-based listing for accessing additional time-ranked results. A scrolling option can optionally be provided for the relevance-based listing for accessing additional relevance-ranked results.

In accordance with at least one embodiment, a number of entries in the relevance-based and time-based listings displayed in areas 204 and 206 (respectively) is no greater than the total number of entries, k, set for display area 202. A maximum number of messages selected for inclusion in the relevance-based listing can be represented as, H, which is a number not exceeding k. In accordance with one or more embodiments, H can be, but need not be, a number less than a number of time-based entries. The number of messages included in the relevance-based listing may be a fixed number or a variable number. The variable number may have a range from zero to a maximum threshold number, where the maximum threshold number does not exceed the total number, k.

Referring again to FIG. 1, the first number of messages selected from the time-ranked result set at step 106 can be a number that is less than or equal to k. In accordance with one or more embodiments, the first number of messages selected for the time-based listing can be dependent on the number of the messages selected from the relevance-ranked search results for the relevance-based listing. As is discussed in more detail below, the first number of messages selected from the time-ranked result set for the time-based listing is the display size, k, less the second number of messages selected from the relevance-ranked result set, and the second number of messages can vary up to a maximum threshold number, H. Where the number of messages selected for the second message set is H, the number of messages selected for the first message set can be represented as k-H.

At step 108, a determined second number of messages are selected based on relevance to the search query. In an embodiment, the determined second number of messages is a predetermined number, which can be a fixed number which is not dependent on the relevance of one or more messages selected for the time-based listing, the relevance of one or more messages selected for the relevance-based listing, etc. Alternatively, the second number of messages can be a variable number, which can vary based on the relevance of one or more messages selected for the time-based listing, the relevance of one or more messages selected for the relevance-based listing, etc. The variable second number of messages is bounded by the maximum threshold value, H.

In accordance with at least one embodiment, whether a fixed or variable number is used for the determined second number of messages, to avoid duplication across the time-based and relevance-based listings, the determined second number of messages selected at step 108 are selected from the relevance-ranked result set excluding any message included in the first number of messages. In other words, with reference to FIG. 2 and in accordance with at least one embodiment, a message included in the time-based listing displayed in display area 206 of FIG. 2, is not repeated, or duplicated, in the relevance-based listing displayed in display area 204, and vice versa.

At step 110, a search results display presentation comprising a time-based listing and selectively including a relevance-based listing is generated. In the example shown in FIG. 2, the search results display presentation that is generated includes a relevance-based listing displayed in display area 204 and a time-based listing displayed in display area 206. In accordance with one or more embodiments, the second section can be selectively included in the search results display presentation based on the determined second number of messages in the second message set, which determined second number of messages can vary from zero to a maximum threshold number.

By way of a non-limiting example, the determined second number of messages can be a predetermined, non-zero number, which can be based on the search results display presentation's total number of entries and the first number of messages. In such a case, a determination is made to include the second display area in the search results display presentation. The second display area included in the search results display area comprises an entry for each message of the determined second number of messages in the second message set ordered based on relevance to the search query.

By way of another non-limiting example, the determined second number is a variable number and has a value range from zero to a threshold maximum second number of messages. In embodiments, the determined second number can be determined with respect to the relevance score of the highest relevant message not included in the first number of messages and the oldest time result included in the first number of messages, which comparison leads either to including the relevant result in the second number of messages or to a determination to stop adding messages to the second number of messages. The first number of messages is based on the search results display presentation's number of entries, k, and the determined second number of messages. The second display area is included in the search results display presentation if the determined second number is a non-zero value. If it is included in the search results display area, the second display area comprises an entry for each message of the determined second number of messages in the second message set ordered based on relevance to the search query.

The generated display presentation is provided for display at the requesting user's computing device at step 112. By way of a non-limiting example, a server computing device may provide the display presentation to a client computing device for display, which client computing device can receive and display the search results including relevance-based entries. As yet another non-limiting example, a client computing device can perform the steps shown in FIG. 1, in which case the client computing device can provide the display presentation to a display interface for output at the client computing device.

Referring again to FIG. 2, the search results display presentation is output using a smartphone. It should be apparent that any user computing device, including without limitation a desktop computer, a laptop, a tablet, etc., may be used with embodiments of the present disclosure.

Figure 3A:
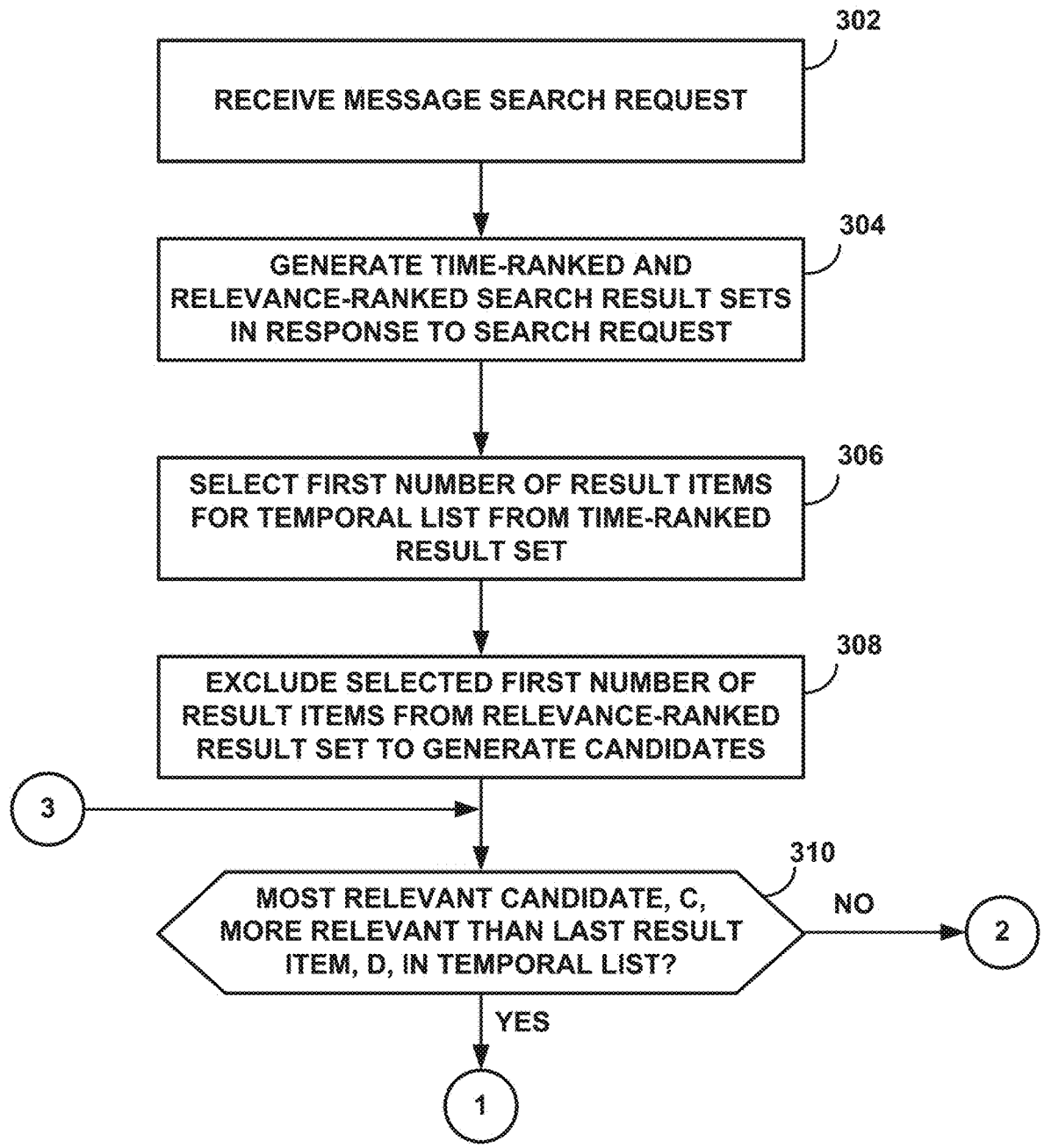
Figure 3B:
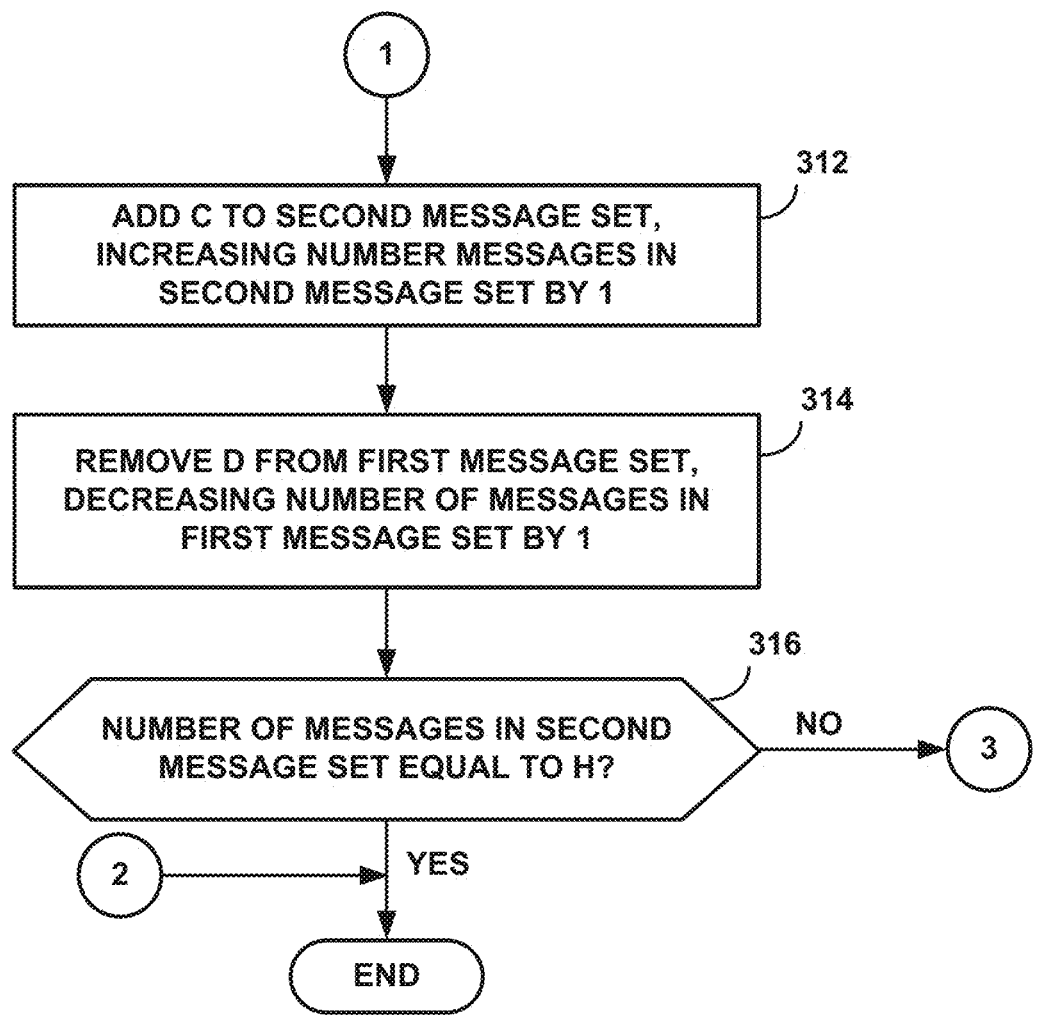

FIG. 3, which comprises FIGS. 3A and 3B, provides an example of a message selection process flow in accordance with one or more embodiments of the present disclosure. The process flow may be executed by a client computing device, or by a server computing device, for example. In the example of FIG. 3, a determined second number of message is variable and can vary from zero to a maximum, or threshold, number. The maximum number can be represented as H.

At step 302, a message search request is received. At step 304, search results are generated using a search query associated with the received request. As discussed above, the search query can comprise one or more search terms which are used to identify two result sets: a time-ranked result set and a relevance-ranked result set. Each result set comprises a number of electronic messages, such as and without limitation email messages, satisfying the search query. Each message has associated temporal data and relevance data. The messages in the time-ranked result set are sorted using the temporal data associated with each message. The messages may be sorted in ascending order based on the temporal data, such that the top-ranked messages in the time-ranked result set are more recent than lower-ranked messages.

At step 306, a number of messages are selected for the first message set from the time-ranked result set. In accordance with at least one embodiment, the number of messages selected for the first message set corresponds to the size of the display area for displaying a response to the search request, such as and without limitation, k, which can vary based on display size, window size, etc. A number of the top-ranked messages, e.g., a number of the newest (or most recent) messages, can be selected for the first message set at step 306.

In the example shown in FIG. 3, the number of relevance-based messages can vary from 0 to a maximum value, or threshold, which may be represented by H. Steps 308-316 can be used to determine the number of messages selected from the relevance-ranked result set for inclusion in the relevance-based listing, and the number of messages ultimately included in the time-based listing. In the example of FIG. 3, the maximum threshold number, H, of relevance-ranked messages can be a preset, or predetermined number, which is less than or equal to k. In accordance with one or more embodiments, the maximum number of messages selected for the relevance-based listing can be, but need not be, less than the number of messages selected for the time-based listing.

Figure 4:
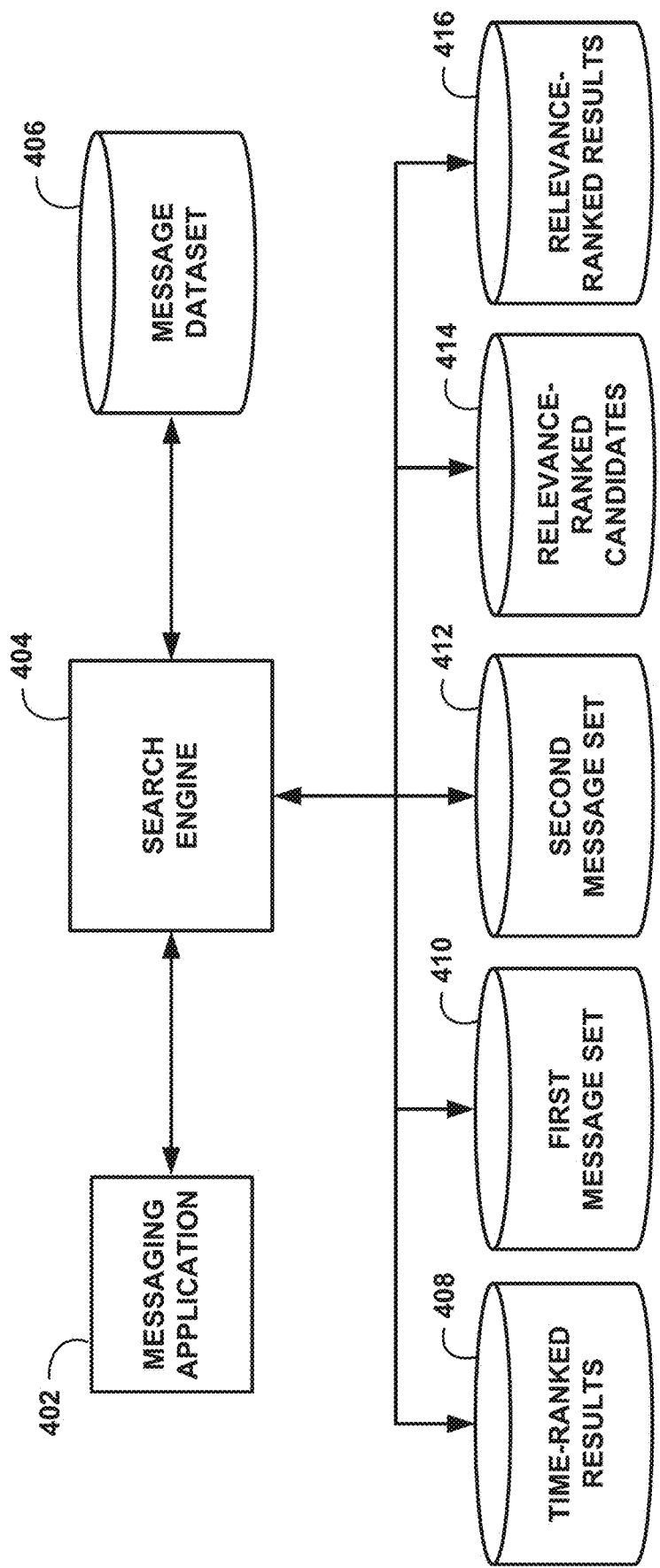

FIG. 4 provides an exemplary overview of components used in connection with the process flow of FIG. 3. A messaging application 402 can receive a search request from the user of a computing device. The received search request can comprise one or more search terms. The messaging application 402 can be a browser application, a messaging client application such as and without limitation Yahoo! Mail®, Outlook®, etc. The user's computing device can be configured to include the messaging application 402 alone or in combination with search engine 404. Alternatively, a server computing device can be configured to provide search engine 404.

In the example of FIG. 4, search engine 404 searches a message database 406 using a search query received by search engine 404 from messaging application 402 to generate time-ranked search results 408 and relevance-ranked results 416, as discussed above. Message database 406 can comprise messages in a user's message store, message database, which may include without limitation messages in the user's mail inbox, or folder, saved message folder, etc.

Time-ranked search results 408 and relevance-ranked search results 416 can be generated by search engine 404 at step 304 of FIG. 3 using the search query associated with the search request. First message set 410 can be generated by the search engine 404 at step 306 by selecting a first number of the top-ranked messages from the time-ranked search results 408 sorted in temporal order, e.g., most-recently received messages, most-recently sent messages, etc.

At step 308 of FIG. 3, a set of candidate messages, such as candidate message set 414, is identified. In accordance with at least one embodiment, the candidate message set 414 includes those messages from the relevance-ranked search results 416 excluding any messages included in the first message set 410. The messages in the candidate message set 414 are sorted by order of relevance in accordance with the relevance data associated with each message in the candidate message set 414, and the messages in the first message set 410 are sorted based on each message's temporal data.

At step 310, a determination is made whether the most relevant candidate, C, from the candidate message set 414 is more relevant than a given message in the first message set 410. The first candidate, C, in the candidate set 414 is the most relevant of the candidates in the candidate message set 414, and it is selected for use in the determination made at step 310. By way of a further non-limiting example, the given message used in the determination at step 310 is the last message, e.g., oldest message relative to the other messages, in the temporal sort of the first message set 410, which can be determined using the temporal data associated with each message in the first message set 410.

If it is determined, at step 310, that the most relevant candidate, C, is not more relevant than the given message, e.g., the oldest message, from the first message set 410, processing ends. In the case that the first candidate, C, selected from the candidate message set 414 is not more relevant to the search query than the given message, e.g., the last message, oldest message, etc., in the first message set 410, the determined number of messages for the second message set is set to zero.

If it is determined, at step 310, that the most relevant candidate, C, is more relevant than the given message, e.g., the oldest message, in the first message set 410, processing continues at step 312 of FIG. 3B. At step 312, the candidate message, C, is added to the second message set 412, which is referred to as the relevance-based, or hero, list. An entry corresponding to the message added to the second message set 412 can be displayed in a relevance-based listing in display area 204 of FIG. 2.

Processing continues at step 314 to remove, from the first message set 410, the given message, D, which is determined to be less relevant than the candidate message, C. The message, D, removed from the first message set is excluded from the time-based listing and is not displayed in display area 206 of FIG. 2.

At steps 312 and 314, the number of messages in the second message set 412 is increased by one and the number of messages in the first message set 410 is decreased by one, such that the combined number of messages in the first message set 410 and the second message set 412 remains equal to the total number of entries in the search results display presentation, e.g., presentation displayed in display area 202 of FIG. 2.

Processing continues at step 316 to make a determination whether or not the number of messages in the second message set 412 is equal to a maximum threshold number of second messages, H. If so, processing ends. If not, processing continues at step 310 to make a determination whether or not to add any more messages to the second message set 412 using a new candidate, C, which is the next most relevant message in the candidate message set 414.

In accordance with one or more embodiments, the maximum number, H, of messages in the second message set can be, but need not be, smaller than the number of messages in the first message set 410. In accordance with at least one embodiment, the combined number of messages in the first and second messages sets 410 and 412 (respectively) is equal to the display size, k. In the example shown in FIG. 2, the display size is equal to 6, with two messages in the second message set 412 corresponding to the two entries in the relevance-based, or heroes, list in display area 204 and four messages in the first message set 410 corresponding to the remaining four entries in the time-based list displayed in display area 206. With reference to FIG. 3, each entry in display area 204 corresponds to a candidate message determined to be more relevant to the search query than a given message that was removed from the first message set 410.

As illustrated in FIG. 3, in accordance with one or more embodiments, messages are selected for the first and second message sets so that there are no duplicate messages, e.g., a message selected for one message set is not included in the other message set. For example, assume that the most relevant (relative to other messages in the first message set 410) message in the first message set 410 is repeated in the second message set. The relevance of the messages presented to the user does not change, since the same messages are presented to the user. In embodiments of the present disclosure, a less relevant message is removed from the presentation so that a more relevant message can be included in the representation provided to the user, which results in an increased, or optimized, relevance of the presentation.

Figure 5:
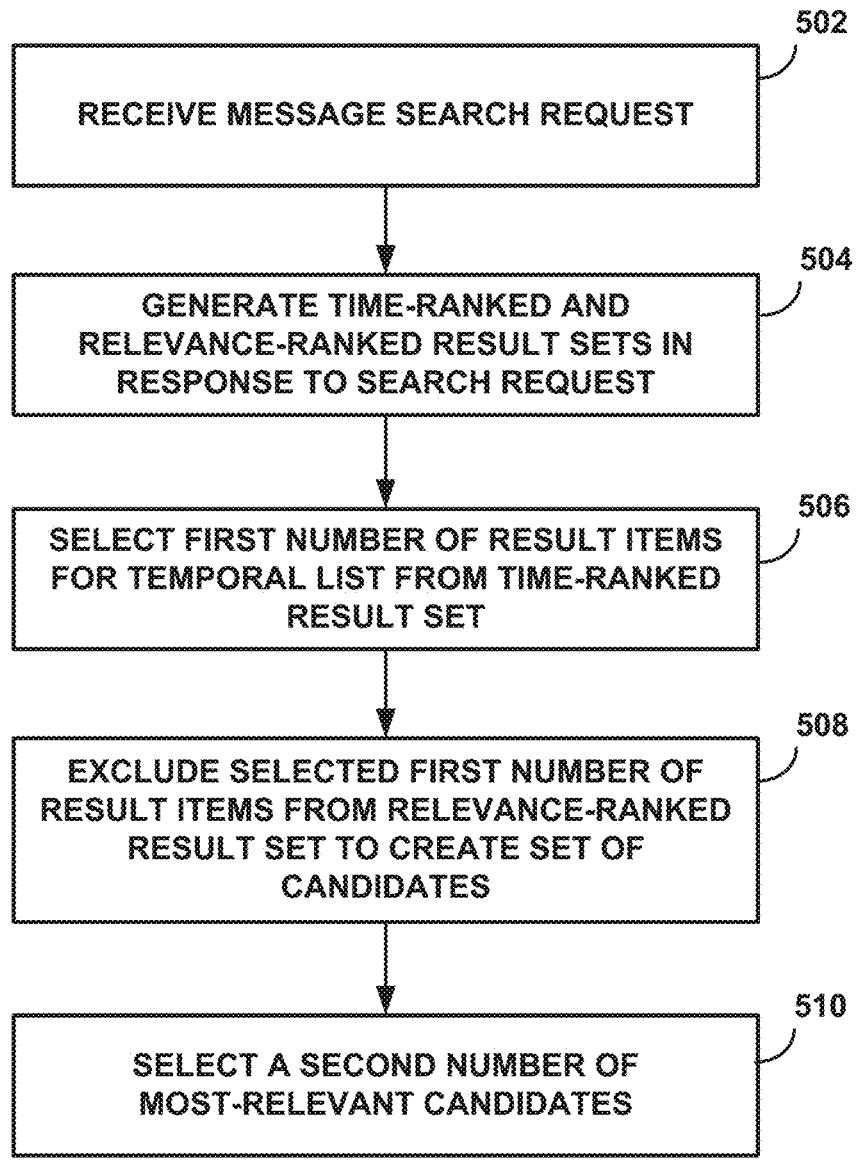

In the example of FIG. 3, the determined second number of message can vary from zero to a maximum, or threshold, number, FIG. 5 provides another message selection process flow in accordance with one or more embodiments of the present disclosure. In the example of FIG. 5, the determined second number of messages is a fixed number, e.g., a number that can be, but need not be, smaller than a first number of messages of the first message set. The process flow example shown in FIG. 5 may be executed by a client computing device, or by a server computing device, for example.

At step 502, a message search request is received. At step 504, time-ranked and relevance-ranked search results are generated using a search query associated with the received request. The search query can comprise one or more search terms which are used to generate the set of search results comprising a number of electronic messages, such as and without limitation email messages, satisfying the search query. Each message identified using the search query has associated temporal data and relevance score. As discussed above, the messages in the time-ranked result set are sorted (from newest to oldest) using the corresponding temporal data, and the messages in the relevance-ranked result set are sorted (most to least relevant) using the corresponding relevance score.

At step 506, a number of messages, e.g., k-H, are selected for the first message set from the time-ranked (and time-sorted) search result set. As discussed herein, the variable k corresponds to the size of the display area for displaying a response to the search request, which may vary based on the display size, window size, etc., and the variable H corresponds to a maximum threshold number of messages to be selected from the relevance-ranked search result set.

At step 508, a set of candidate messages, such as candidate message set 414, is identified. In accordance with at least one embodiment, the candidate message set 414 comprises the messages from the relevance-ranked search result set 416 excluding any messages selected for the first message set 410 at step 506.

At step 510, a number, e.g., H, messages are selected from the candidate message set 414 based on relevance to the search query. In other words, the H most relevant messages in the candidate message set 414 are selected for the second message set 412 at step 510.

As in the example of FIG. 3, there is no message duplication in the first and second message sets 410 and 412 (respectively). In FIG. 5, as in FIG. 3, relevance to the search query is optimized, or maximized. In the process flow example of FIG. 5, the H most relevant messages from the candidate message set 414, which excludes any messages selected for the first message set 410, are selected for the second message set 412.

Assume for the sake of illustration that a message in the second message set 412 is a duplicate of a message in the first message set 410, such as in a case that the same message is selected for both the second message set 412 and the first message set 410. The relevance of the messages presented to the user does not change, since the same messages are presented to the user. In contrast, in the example of FIG. 5, there is no duplication. A message that may just miss being selected for the first message set 410, e.g., it is older than the last message selected for the first message set 410 and is one of the top H relevant messages in the candidate message set 414 is selected for the second message set 414 to be presented to the user. As such, the relevance of the messages provided to the user is maximized, or optimized, since the relevance results displayed in display area 204 are the most relevant messages excluded from the time-based listing, which is left untouched.

Figure 6:
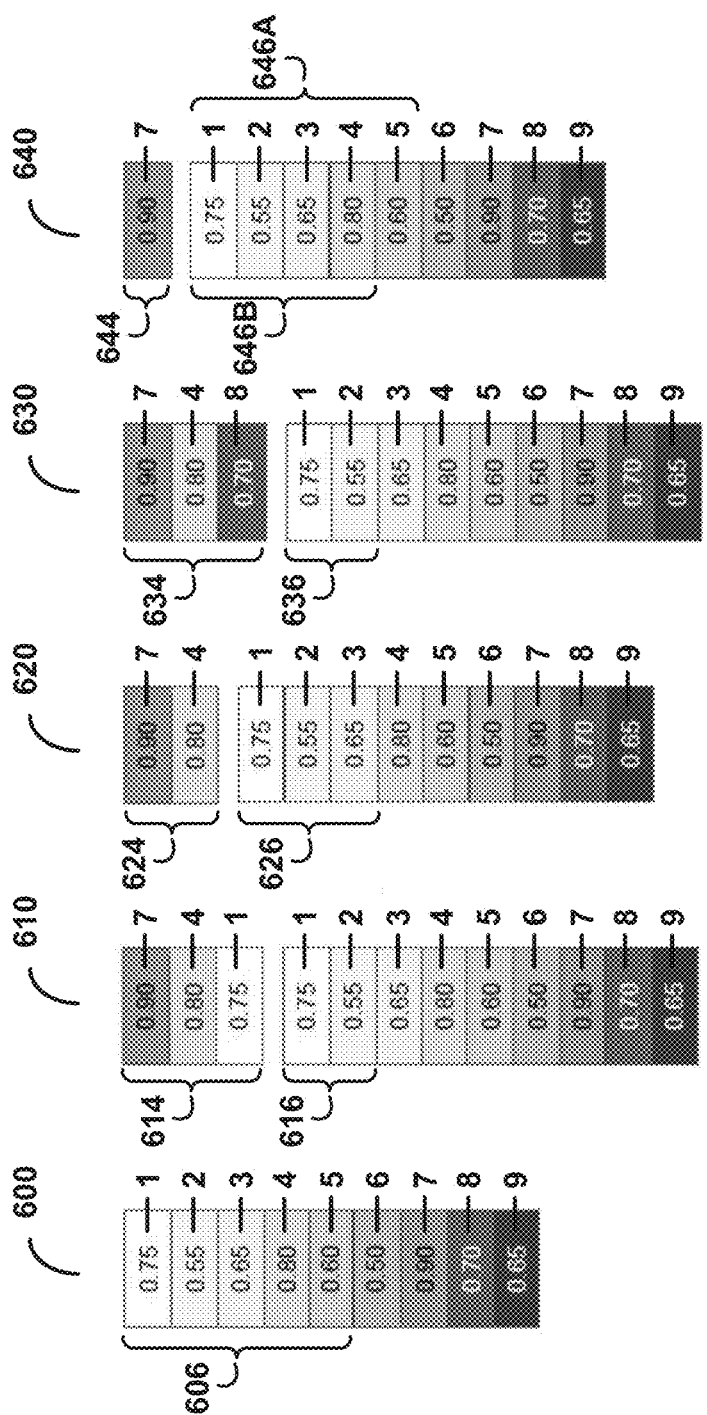

FIG. 6 provides some examples illustrating search result presentation listings in accordance with one or more embodiments of the present disclosure. In each instance, the display size, k, is set to 5 entries. Each of the illustrations 600, 610, 620, 630 and 640 assumes that a search query identified 9 messages as search results. Each message has temporal data and a relevance score. In the example shown in FIG. 6, the most relevant message (item no. 7) has a 0.90 relevance score, and the least relevant message (item no. 6) has a relevance score of 0.50.

Illustration 600 includes 9 items, each representing a message in the search results generated from the search query. The search result items are sorted from 1 to 9 based on the temporal data associated with each message, and each item has an associated number representing the corresponding message's relevance to the search query. For example, item no. 1 corresponds to the top-ranked message in a sort based on temporal data and has a relevance score of 0.70, and item no. 9 corresponds to the lowest-ranked message in the temporal sort and has a 0.65 relevance score. Since the temporal sort is from newest (e.g., most-recently received, sent, etc.) to oldest (e.g., least-recently received, sent, etc.), item no. 1 corresponds to the newest message in the search results and item no. 9 corresponds to the oldest message.

With reference to FIG. 2, display area 206 would include an entry for each message corresponding to item nos. 1-5 and identified by bracket 606. In other words, the bracketed items represent the top five messages in a temporal order. It can be seen a presentation based solely on time can be missing a message that is most relevant to a search query.

In contrast to illustration 600, illustration 610 includes two listings of messages corresponding to brackets 614 and 616. In the illustration 610, relevance is not maximized, or optimized, since at least one message is duplicated across the two listing. In illustration 610, item no. 1 is duplicated in the relevance-based listing and in the time-based listing. A display area available for a search results display presentation is limited, duplication across the relevance-based and temporal listings is a waste of the limited display area.

In contrast to illustrations 600 and 610, illustration 620 includes two listings without duplication across the listings. Illustration 620 corresponds to a very simple approach where top relevance results are taken and then duplicates are removed according to time results. In contrast to illustration 610, item no. 1 is not duplicated in the relevance-based listing identified with bracket 624 in illustration 620, and item no. 3 excluded from the temporal-listing in illustration 610 is included in the items in bracket 626 in illustration 620. This results in the message corresponding to item no. 3 having an entry in display area 206 of FIG. 2.

Illustration 630 is an example in which message are identified for the relevance-based and time-based listings using a process such as that illustrated in FIG. 5. The number of messages for a time-based listing and the number of messages for a relevance-based listing are fixed. The fixed number for the relevance-based listing can be represented as H and the number of messages for the time-based listing can be represented as k-H, where k represents the total number of entries for a display. In illustration 630, H is set to 3, k is equal to 5 and k-h is equal to 2.

In accordance with the process shown in the example of FIG. 5, the top 2 time-sorted messages represented as item nos. 1 and 2 are selected for the time-based listing, as illustrated by bracket 636. An entry corresponding to each messages selected for the time-based listing can be displayed in display area 206 of FIG. 2. Messages corresponding to item nos. 3-9 are selected for the candidate message set 414, which is sorted by relevance, and the top 3 relevance-sorted messages, which correspond to item nos. 7, 4 and 8, are selected for the relevance-based listing, as illustrated by bracket 634. An entry corresponding to each messages selected for the relevance-based listing can be displayed in display area 204 of FIG. 2.

Illustration 640 is an example in which message are identified for the relevance-based and time-based listings using a process such as that illustrated in FIG. 3. The number of messages for a time-based listing and the number of messages for a relevance-based listing can vary. A maximum number of messages selected for the relevance-based listing can be represented as H and the number of messages for the time-based listing can be determined to be k less the number of messages selected for the relevance-based listing. In illustration 630, H is set to 3 and k is equal to 5.

In accordance with the process shown in the example of FIG. 3, the top 5 time-sorted messages represented as item nos. 1-5 are initially selected for the time-based listing, as illustrated by bracket 646A. Messages corresponding to item nos. 6-9 are initially selected for the candidate message set 414, which is sorted by relevance. The most relevant message corresponds to item no. 7, which has a relevance score of 0.90. In the example provided by illustration 640, the relevance score of the oldest message selected for the time-based listing, or item no. 5, is determined to be less than the relevance score of item no. 7. As a result, the message corresponding to item no. 5 is removed from the time-based listing (as illustrated by bracket 646B) and added to the candidate message set 414, and the message corresponding to item no. 7 is added to the relevance-based list (as illustrated by bracket 644) and removed from the candidate message set 414.

Candidate message set 414 is updated to include messages corresponding to item nos. 5, 6, 8 and 9. The messages in the candidate message set 414 are sorted by relevance and the message corresponding to item no. 8 is the most relevant of the messages in the updated candidate message set 414. Since the relevance score of the oldest message (corresponding to item no. 4) in the first message set 410 is greater than the relevance score of item no. 8, the message corresponding to item no. 8 is not added to the relevance-based listing, and the relevance-based listing is set to be one entry corresponding to message represented by item no. 7. Display area 204 includes 1 entry for the message corresponding to item no. 7 and display area 206 includes 4 entries for the messages corresponding to item nos. 1-4.

Figure 7:
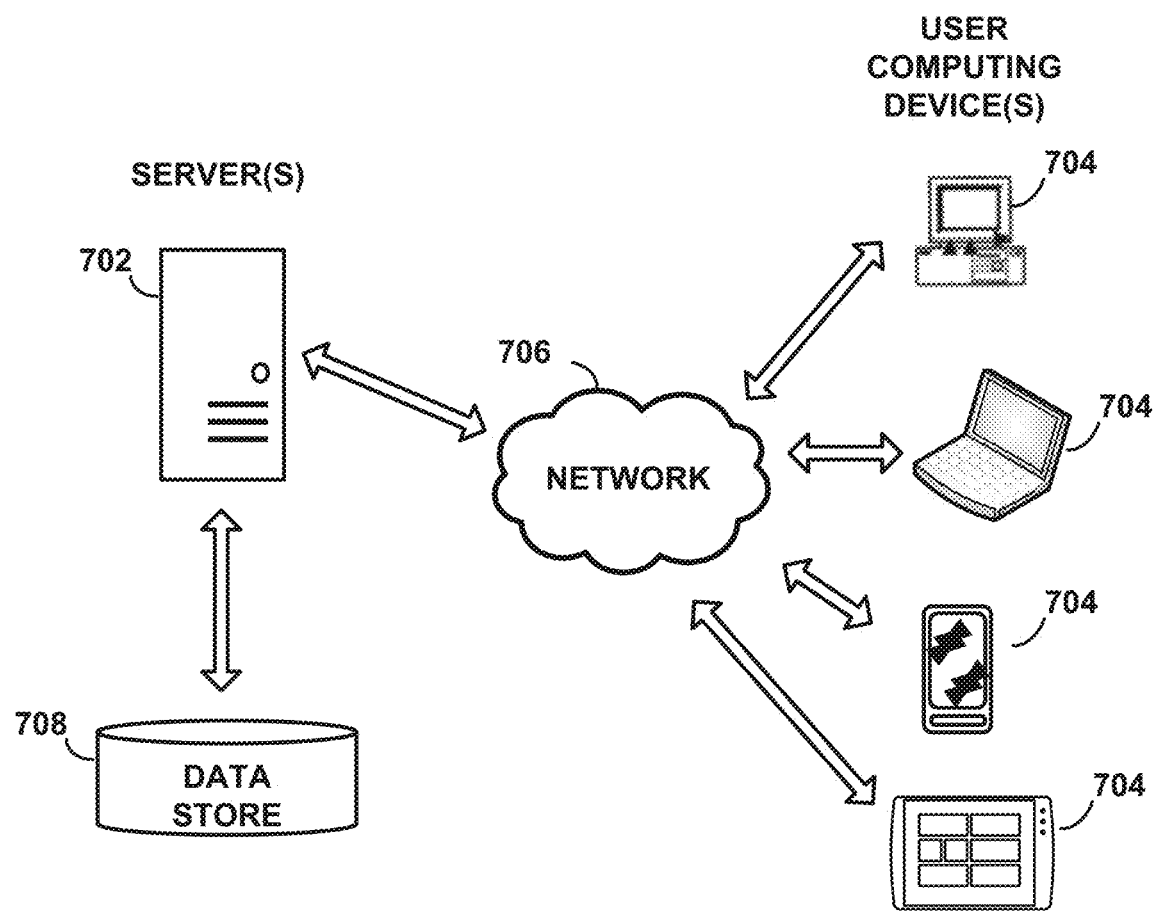
FIG. 7 illustrates some components that can be used in connection with one or more embodiments of the present disclosure.

FIG. 7 illustrates some components that can be used in connection with one or more embodiments of the present disclosure. In accordance with one or more embodiments of the present disclosure, one or more computing devices, e.g., one or more servers, user devices or other computing device, are configured to comprise functionality described herein. For example, a computing device 702 can be configured to execute program code, instructions, etc. to provide functionality in accordance with one or more embodiments of the present disclosure. The same or another computing device 702 may be configured to execute program code to implement functionality in accordance with one or more embodiments of the present disclosure.

Computing device 702 can serve content to user computing devices 704 using a browser application via a network 706. Data store 708 can be used to store program code to configure a server 702 to functionality in accordance with one or more embodiments of the present disclosure.

The user computing device 704 can be any computing device, including without limitation a personal computer, personal digital assistant (PDA), wireless device, cell phone, internet appliance, media player, home theater system, and media center, or the like. For the purposes of this disclosure a computing device includes a processor and memory for storing and executing program code, data and software, and may be provided with an operating system that allows the execution of software applications in order to manipulate data. A computing device such as server 702 and the user computing device 704 can include one or more processors, memory, a removable media reader, network interface, display and interface, and one or more input devices, e.g., keyboard, keypad, mouse, etc. and input device interface, for example. One skilled in the art will recognize that server 702 and user computing device 704 may be configured in many different ways and implemented using many different combinations of hardware, software, or firmware.

In accordance with one or more embodiments, a computing device 702 can make a user interface available to a user computing device 704 via the network 706. The user interface made available to the user computing device 704 can include content items, or identifiers (e.g., URLs) selected for the user interface in accordance with one or more embodiments of the present invention. In accordance with one or more embodiments, computing device 702 makes a user interface available to a user computing device 704 by communicating a definition of the user interface to the user computing device 704 via the network 706. The user interface definition can be specified using any of a number of languages, including without limitation a markup language such as Hypertext Markup Language, scripts, applets and the like. The user interface definition can be processed by an application executing on the user computing device 704, such as a browser application, to output the user interface on a display coupled, e.g., a display directly or indirectly connected, to the user computing device 704.

In an embodiment the network 706 may be the Internet, an intranet (a private version of the Internet), or any other type of network. An intranet is a computer network allowing data transfer between computing devices on the network. Such a network may comprise personal computers, mainframes, servers, network-enabled hard drives, and any other computing device capable of connecting to other computing devices via an intranet. An intranet uses the same Internet protocol suite as the Internet. Two of the most important elements in the suite are the transmission control protocol (TCP) and the Internet protocol (IP).

As discussed, a network may couple devices so that communications may be exchanged, such as between a server computing device and a client computing device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs. A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

A wireless network may couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example. For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

Signal packets communicated via a network, such as a network of participating digital communication networks, may be compatible with or compliant with one or more protocols. Signaling formats or protocols employed may include, for example, TCP/IP, UDP, DECnet, NetBEUI, IPX, Appletalk, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

It should be apparent that embodiments of the present disclosure can be implemented in a client-server environment such as that shown in FIG. 7. Alternatively, embodiments of the present disclosure can be implemented with other environments. As one non-limiting example, a peer-to-peer (or P2P) network may employ computing power or bandwidth of network participants in contrast with a network that may employ dedicated devices, such as dedicated servers, for example; however, some networks may employ both as well as other approaches. A P2P network may typically be used for coupling nodes via an ad hoc arrangement or configuration. A peer-to-peer network may employ some nodes capable of operating as both a "client" and a "server."

Figure 8:
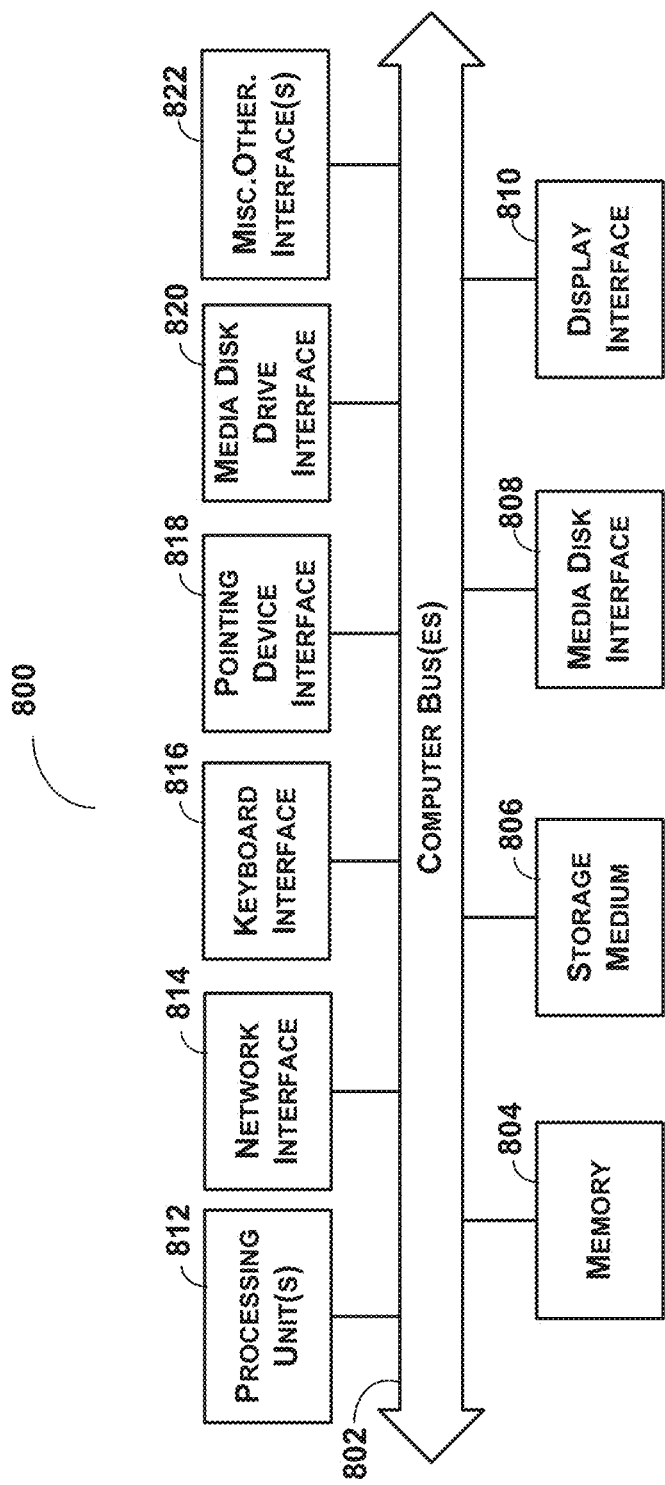
FIG. 8 is a detailed block diagram illustrating an internal architecture of a computing device in accordance with one or more embodiments of the present disclosure.

FIG. 8 is a detailed block diagram illustrating an internal architecture of a computing device, e.g., a computing device such as server 702 or user computing device 704, in accordance with one or more embodiments of the present disclosure. As shown in FIG. 8, internal architecture 800 includes one or more processing units, processors, or processing cores, (also referred to herein as CPUs) 812, which interface with at least one computer bus 802. Also interfacing with computer bus 802 are computer-readable medium, or media, 806, network interface 814, memory 804, e.g., random access memory (RAM), run-time transient memory, read only memory (ROM), etc., media disk drive interface 820 as an interface for a drive that can read and/or write to media including removable media such as floppy, CD-ROM, DVD, etc. media, display interface 810 as interface for a monitor or other display device, keyboard interface 816 as interface for a keyboard, pointing device interface 818 as an interface for a mouse or other pointing device, and miscellaneous other interfaces not shown individually, such as parallel and serial port interfaces, a universal serial bus (USB) interface, and the like.

Memory 804 interfaces with computer bus 802 so as to provide information stored in memory 804 to CPU 812 during execution of software programs such as an operating system, application programs, device drivers, and software modules that comprise program code, and/or computer-executable process steps, incorporating functionality described herein, e.g., one or more of process flows described herein. CPU 812 first loads computer-executable process steps from storage, e.g., memory 804, computer-readable storage medium/media 806, removable media drive, and/or other storage device. CPU 812 can then execute the stored process steps in order to execute the loaded computer-executable process steps. Stored data, e.g., data stored by a storage device, can be accessed by CPU 812 during the execution of computer-executable process steps.

Persistent storage, e.g., medium/media 806, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may he made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

The invention claimed is:

1. A computing device comprising:
   a processor; and
   a storage medium for tangibly storing thereon program logic for execution by the processor, the stored program logic comprising:
      receiving logic executed by the processor for receiving a message search request as a single request of the user;
      generating logic executed by the processor for generating both time-ranked search results and relevance-ranked search results in response to the message search request, the time-ranked search results comprising a temporally-ranked set of messages selected from a corpus of messages using a search query associated with the received search request and the relevance-ranked search results comprising a relevance-ranked set of messages selected from the corpus using the search query, each selected message having temporal data and a relevance score representing its relevance to the search query;
      selecting logic executed by the processor for selecting a first number of messages from the time-ranked search results for a first message set to be displayed in a search results display presentation for the user, the first message set selection being based on a temporal ordering of the search results in the time-ranked search results using the temporal data associated with each message in the time-ranked search results;
      selecting logic executed by the processor for selecting a determined second number of messages from the relevance-ranked search results using relevance scores associated with the relevance-ranked set of messages, the second message set selection comprising ensuring that each message selected for the first message set, from the time-ranked search results, is excluded from the determined second number of messages of a second message set selected from the relevance-ranked search results;
      generating logic executed by the processor for generating the search results display presentation in response to the message search request, the search results display presentation having a first display area comprising an entry for each message in the first message set temporally ordered in accordance with the temporal data of the messages selected for the first message set, the generating comprising determining based on the determined second number of messages whether to include a second display area comprising an entry for each message of the determined second number of messages in the second message set ordered based on relevance to the search query; and
      providing logic executed by the processor for providing the display presentation for display by a client computing device in response to the message search request.

2. The computing device of claim 1, the determined second number of messages is a predetermined number that is greater than zero and is based on the search results display presentation's total number of entries and the first number of messages, and the generating comprising determining to include the second display area comprising an entry for each message of the predetermined second number of messages in the second message set ordered based on relevance to the search query.

3. The computing device of claim 1, the determined second number of messages is determined in accordance with a determined relevance of at least one message in the first set of messages, and the first number of messages is based on the search results display presentation's total number of entries and the determined second number of messages.

4. The computing device of claim 3, selecting logic executed by the processor for selecting a determined second number of messages further comprising:
   identifying logic executed by the processor for identifying a candidate message set comprising the relevance-ranked search results excluding any message included in the first message set;
   selecting logic executed by the processor for selecting a candidate message from the candidate message set, the selected candidate message is more relevant to the search query than any other candidate message in the candidate message set;
   determining logic executed by the processor for making a first determination whether the selected candidate message is more relevant to the search query than an oldest message in the first message set; and
   performing logic executed by the processor for selectively performing the following if the first determination indicates that the selected candidate message is more relevant than the oldest message:
      updating logic executed by the processor for updating the first and second message sets by adding the most relevant candidate message to the second message set and removing the oldest message from the first message set;
      determining logic executed by the processor for making a second determination whether or not the second number of messages reaches a threshold number of messages;
      if the second determination indicates that the second number of messages is less than the threshold number of messages, repeating logic executed by the processor for repeating the candidate message selection and first determination and selectively performing the updating and the second determination based on the first determination.

5. The computing device of claim 4, the determined second number of messages is variable and has a value range from zero to the threshold, the determined second number of messages being zero if the first determination indicates that the oldest message in the first message set selection selected based on a temporal ordering of the search results is more relevant to the search query than the selected candidate message, and the generating comprising determining to include the second display area in a case that the determined second number of messages is non-zero.

6. The computing device of claim 1, the stored program logic further comprising:

identifying logic executed by the processor for identifying the determined second number of messages by optimizing relevance over both the first and second display areas.

7. The computing device of claim 1, the second display area is positioned above the first display area in the search results display presentation and the second display area has a visual appearance different from the first display area's visual appearance.

8. A method comprising:

receiving, by a computing device, a message search request as a single request of the user;

generating, by the computing device, both time-ranked search results and relevance-ranked search results in response to the message search request, the time-ranked search results comprising a temporally-ranked set of messages selected from a corpus of messages using a search query associated with the received search request and the relevance-ranked search results comprising a relevance-ranked set of messages selected from the corpus using the search query, each selected message having temporal data and a relevance score representing its relevance to the search query;

selecting, by the computing device, a first number of messages from the time-ranked search results for a first message set to be displayed in a search results display presentation for the user, the first message set selection being based on a temporal ordering of the search results in the time-ranked search results using the temporal data associated with each message in the time-ranked search results;

selecting, by the computing device, a determined second number of messages from the relevance-ranked search results using relevance scores associated with the relevance-ranked set of messages, the selecting comprising ensuring that each message selected for the first message set, from the time-ranked search results, is excluded from the determined second number of messages of a second message set selected from the relevance-ranked search results;

generating, by the computing device, the search results display presentation in response to the message search request, the search results display presentation having a first display area comprising an entry for each message in the first message set temporally ordered in accordance with the temporal data of the messages selected for the first message set, the generating comprising determining based on the determined second number of messages whether to include a second display area comprising an entry for each message of the determined second number of messages in the second message set ordered based on relevance to the search query; and providing, by the computing device, the display presentation for display by a client computing device in response to the message search request.

9. The method of claim 8, the determined second number of messages is a predetermined number that is greater than zero and is based on the search results display presentation's total number of entries and the first number, and the generating comprising determining to include the second display area comprising an entry for each message of the predetermined second number of messages in the second message set ordered based on relevance to the search query.

10. The method of claim 8, the determined second number of messages is determined in accordance with a determined relevance of at least one message in the first set of messages, and the first number of messages is based on the search results display presentation's total number of entries and the determined second number of messages.

11. The method of claim 10, selecting a determined second number of messages further comprising:

identifying a candidate message set comprising the relevance-ranked search results excluding any message included in the first message set;

selecting a candidate message from the candidate message set, the selected candidate message is more relevant to the search query than any other candidate message in the candidate message set;

making a first determination whether the selected candidate message is more relevant to the search query than an oldest message in the first message set; and selectively performing the following if the first determination indicates that the selected candidate message is more relevant than the oldest message:

updating the first and second message sets by adding the most relevant candidate message to the second message set and removing the oldest message from the first message set;

making a second determination whether or not the second number of messages reaches a threshold number of messages;

if the second determination indicates that the second number of messages is less than the threshold number of messages, repeating the candidate message selection and first determination and selectively performing the updating and the second determination based on the first determination.

12. The method of claim 11, the determined second number of messages is variable and has a value range from zero to the threshold, the determined second number of messages being zero if the first determination indicates that the oldest message in the first message set selection selected based on a temporal ordering of the search results is more relevant to the search query than the selected candidate message, and the generating comprising determining to include the second display area in a case that the determined second number of messages is non-zero.

13. The method of claim 8, further comprising:

identifying the determined second number of messages by optimizing relevance over both the first and second display areas.

14. The method of claim 8, the second display area is positioned above the first display area in the search results display presentation and the second display area has a visual appearance different from the first display area's visual appearance.

15. A non-transitory computer-readable storage medium tangibly encoded with computer-executable instructions, that when executed by a processor associated with a computing device, performs a method comprising:

receiving a message search request as a single request of the user;

generating both time-ranked search results and relevance-ranked search results in response to the message search request, the time-ranked search results comprising a temporally-ranked set of messages selected from a corpus of messages using a search query associated with the received search request and the relevance-ranked search results comprising a relevance-ranked set of messages selected from the corpus using the search query, each selected message having temporal data and a relevance score representing its relevance to the search query;

selecting a first number of messages from the time-ranked search results for a first message set to be displayed in a search results display presentation for the user, the first message set selection being based on a temporal ordering of the search results in the time-ranked search results using the temporal data associated with each message in the time-ranked search results;

selecting a determined second number of messages from the relevance-ranked search results using relevance scores associated with the relevance-ranked set of messages, the selecting comprising ensuring that each message selected for the first message set, from the time-ranked search results, is excluded from the determined second number of messages of a second message set selected from the relevance-ranked search results;

generating the search results display presentation in response to the message search request, the search results display presentation having a first display area comprising an entry for each message in the first message set temporally ordered in accordance with the temporal data of the messages selected for the first message set, the generating comprising determining based on the determined second number of messages whether to include a second display area comprising an entry for each message of the determined second number of messages in the second message set ordered based on relevance to the search query;

providing the display presentation for display by a client computing device in response to the message search request.

16. The non-transitory computer-readable storage medium of claim 15, the determined second number of messages is a predetermined number that is greater than zero and is based on the search results display presentation's total number of entries and the first number of messages, and the generating comprising determining to include the second display area comprising an entry for each message of the predetermined second number of messages in the second message set ordered based on relevance to the search query.

17. The non-transitory computer-readable storage medium of claim 15, the determined second number of messages is determined in accordance with a determined relevance of at least one message in the first set of messages, and the first number of messages is based on the search results display presentation's total number of entries and the determined second number of messages.

18. The non-transitory computer-readable storage medium of claim 17, selecting a determined second number of messages further comprising:
identifying a candidate message set comprising the relevance-ranked search results excluding any message included in the first message set;
selecting a candidate message from the candidate message set, the selected candidate message is more relevant to the search query than any other candidate message in the candidate message set;
making a first determination whether the selected candidate message is more relevant to the search query than an oldest message in the first message set; and
selectively performing the following if the first determination indicates that the selected candidate message is more relevant than the oldest message:
updating the first and second message sets by adding the most relevant candidate message to the second message set and removing the oldest message from the first message set;
making a second determination whether or not the second number of messages reaches a threshold number of messages;
if the second determination indicates that the second number of messages is less than the threshold number of messages, repeating the candidate message selection and first determination and selectively performing the updating and the second determination based on the first determination.

19. The non-transitory computer-readable storage medium of claim 18, the determined second number of messages is variable and has a value range from zero to the threshold, the determined second number of messages being zero if the first determination indicates that the oldest message in the first message set selection selected based on a temporal ordering of the search results is more relevant to the search query than the selected candidate message, and the generating comprising determining to include the second display area in a case that the determined second number of messages is non-zero.

20. The non-transitory computer-readable storage medium of claim 15, further comprising:
identifying the determined second number of messages by optimizing relevance over both the first and second display areas.

21. The non-transitory computer-readable storage medium of claim 15, the second display area is positioned above the first display area in the search results display presentation and the second display area has a visual appearance different from the first display area's visual appearance.

* * * * *